US007242836B2

(12) United States Patent
Fushimi et al.

(10) Patent No.: US 7,242,836 B2
(45) Date of Patent: Jul. 10, 2007

(54) METHOD OF PROCESSING OPTICAL FIBER

(75) Inventors: Masahiro Fushimi, Tokyo (JP); Mitsunori Iima, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 135 days.

(21) Appl. No.: 11/212,720

(22) Filed: Aug. 29, 2005

(65) Prior Publication Data

US 2006/0045447 A1 Mar. 2, 2006

(30) Foreign Application Priority Data

Aug. 30, 2004 (JP) .............................. 2004-249806

(51) Int. Cl.
G02B 6/02 (2006.01)
G01N 21/00 (2006.01)

(52) U.S. Cl. .................... 385/128; 356/73.1; 385/15
(58) Field of Classification Search ................. 385/128
See application file for complete search history.

(56) References Cited

U.S. PATENT DOCUMENTS

| 4,143,940 | A | * | 3/1979 | Khoe ........................... 385/33 |
| 4,978,190 | A | * | 12/1990 | Veith ........................... 385/33 |
| 5,096,301 | A | * | 3/1992 | Stanley ...................... 356/73.1 |
| 2004/0114935 | A1 | | 6/2004 | Fushimi et al. |
| 2004/0120646 | A1 | | 6/2004 | Fushimi et al. |
| 2004/0213515 | A1 | | 10/2004 | Pezeshki et al. |
| 2005/0254396 | A1 | | 11/2005 | Tsukamoto |

FOREIGN PATENT DOCUMENTS

| JP | 5-170428 | 7/1993 |
| JP | 5-333232 | 12/1993 |
| JP | 9-179155 | 7/1997 |
| JP | 2001-305382 | 10/2001 |
| JP | 2002-286977 | 10/2002 |
| JP | 2004-177947 | 6/2004 |

OTHER PUBLICATIONS

English Language Abstract of JP 5-170428.
English Language Abstract of JP 2001-305382.
English Language Abstract of JP 2004-177947.
U.S. Appl. No. 10/701,625 to Fushimi et al., filed on Nov. 6, 2003.
U.S. Appl. No. 11/190,897 to Fushimi, filed on Jul. 28, 2005.
U.S. Appl. No. 11/190,867 to Fushimi, filed on Jul. 28, 2005.

* cited by examiner

*Primary Examiner*—Michelle Connelly-Cushwa
*Assistant Examiner*—Kajli Prince
(74) *Attorney, Agent, or Firm*—Greenblum & Bernstein, P.L.C.

(57) ABSTRACT

There is provided a method of processing an optical fiber having a core and a clad. The optical fiber has a first facet and a second facet. The method includes fixing the optical fiber in a state in which at least a portion thereof is bent in a predetermined curvature radius, applying a resist to a region on the first facet at least including an entirety of the core, irradiating the second facet with light of a predetermined wavelength so that only the resist applied to the core in the first facet is exposed to the light through an inside of the optical fiber, developing the resist, and forming a level gap at a boundary between the core and the clad in the first facet utilizing the resist remaining after the irradiating and the developing.

15 Claims, 7 Drawing Sheets

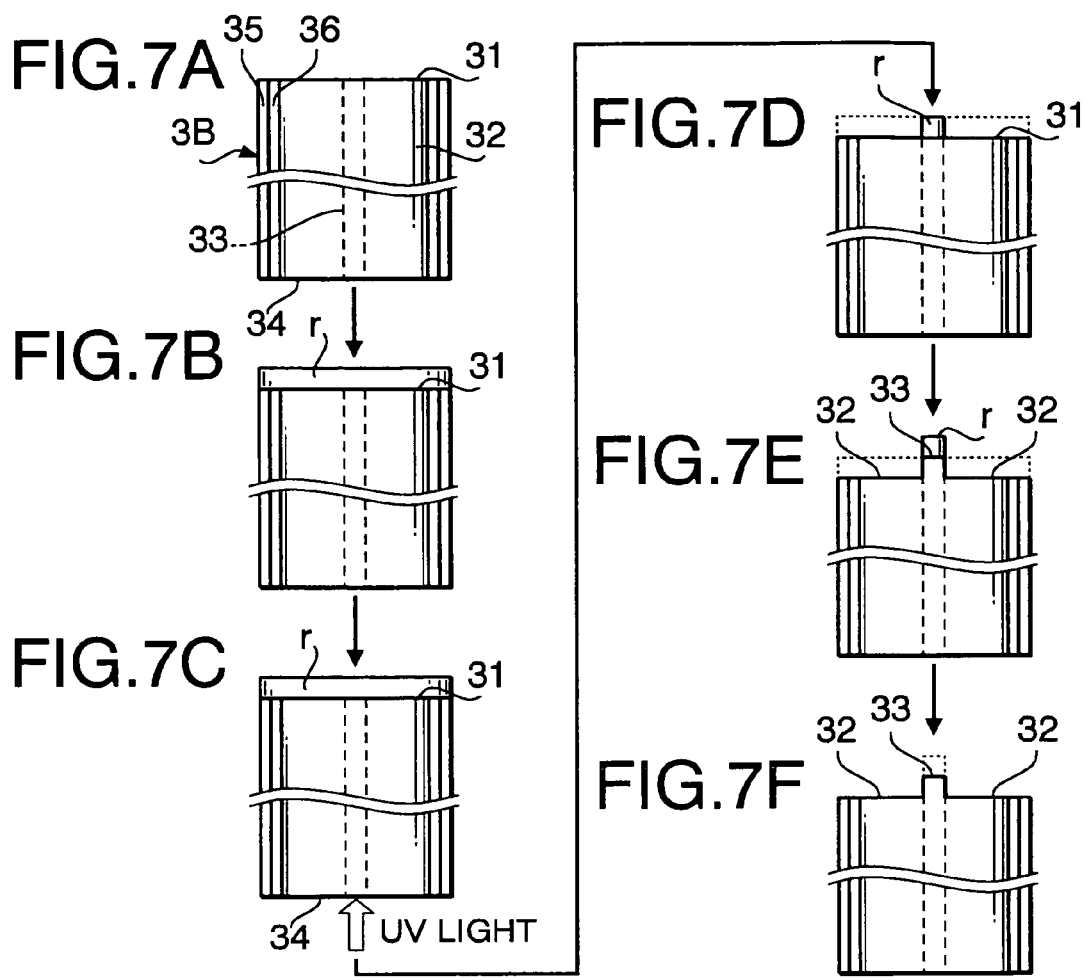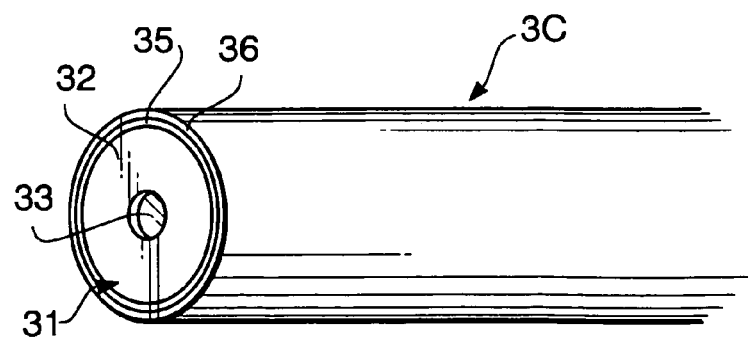

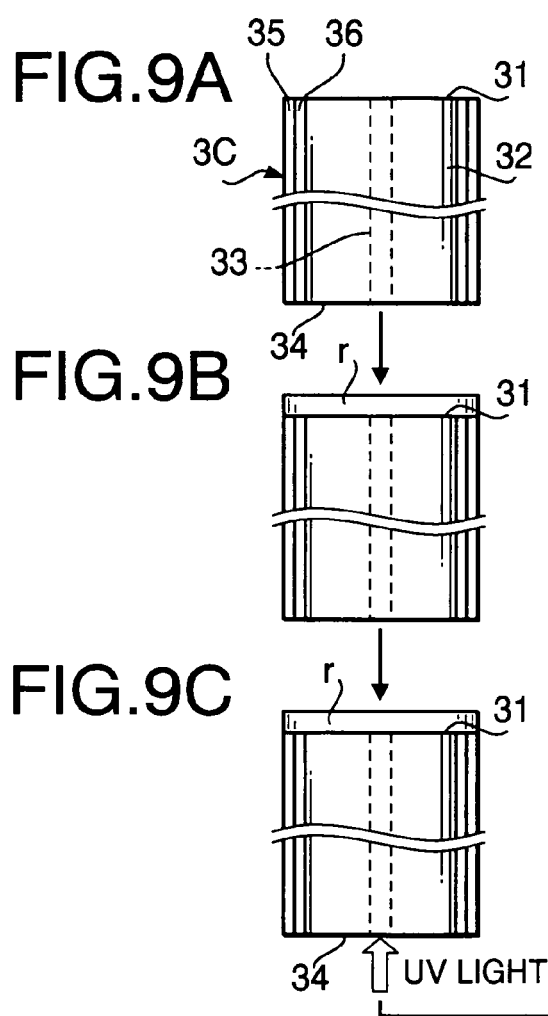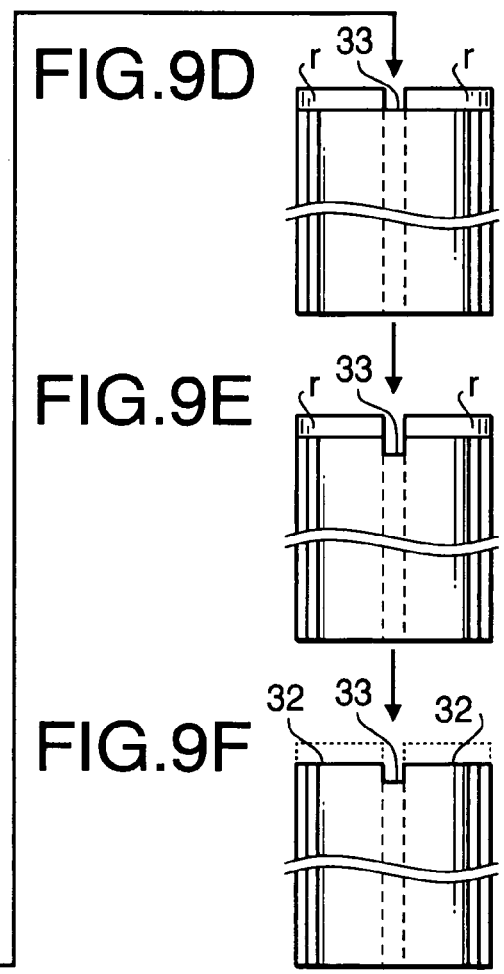

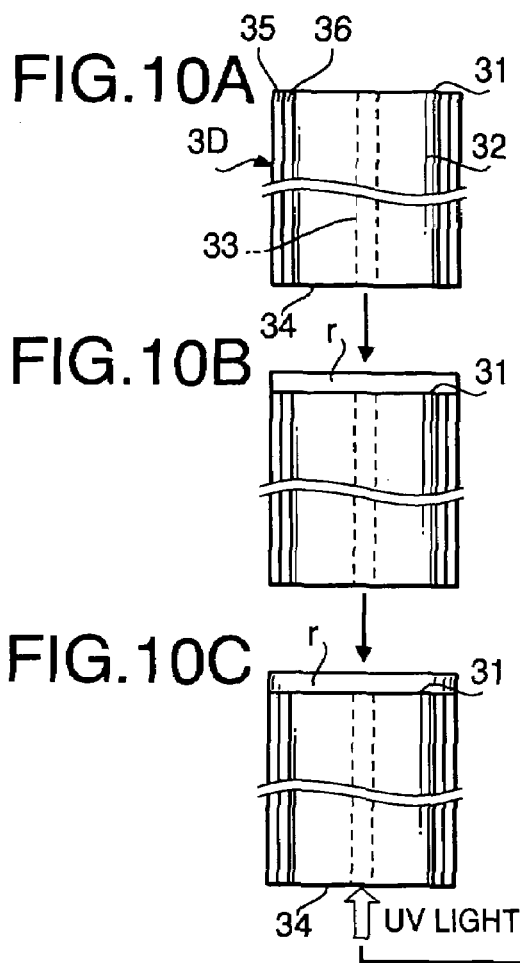
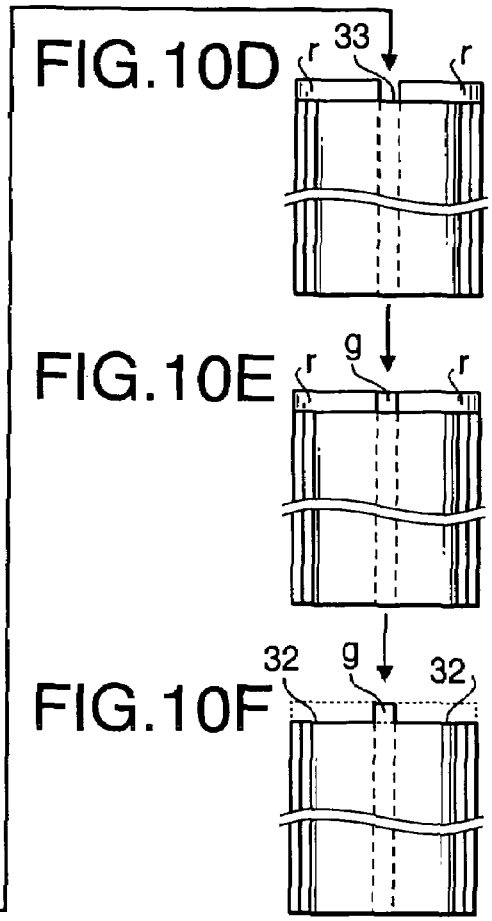
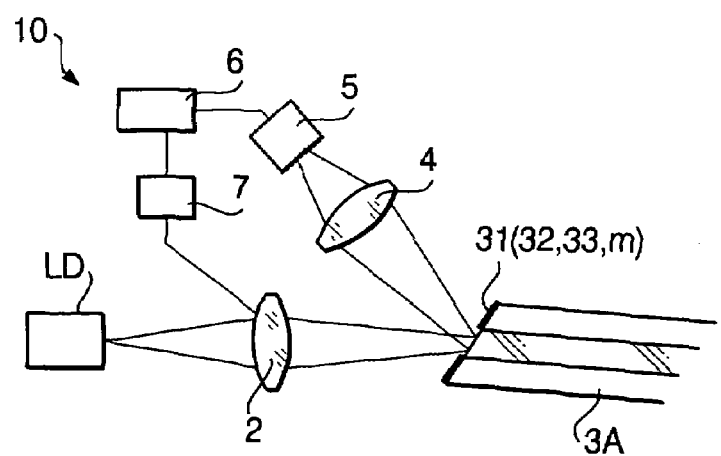

METHOD OF PROCESSING OPTICAL FIBER

INCORPORATION BY REFERENCE

This application claims priority of Japanese Patent Application No. 2004-249806, filed on Aug. 30, 2004, the entire subject matter of the application being incorporated herein by reference.

BACKGROUND OF THE INVENTION

The present invention relates to a method of processing an optical fiber employed in an optical communication apparatus.

An optical communication apparatus includes optical components such as a laser diode (LD), a lens that converges light from the LD, and an optical fiber, for transmitting light emitted by the LD and modulated according to information, to the optical fiber. An optical communication module that serves as an ONU (Optical Network Unit), through which the optical fiber communication is introduced into a subscriber's house, further includes a photoreceptor and a WDM (Wavelength Division Multiplex) filter that separates light of different wavelengths, for performing interactive communication in which a single optical fiber is used for both transmission and reception in common.

In such an optical communication module, signal light from the LD has to be introduced to a generally central portion of a core of the optical fiber, so as to transmit or receive the signal light through the optical fiber. In other words, the LD has to be precisely positioned with respect to the core of only a few microns in diameter, of the optical fiber. In a conventional positioning method, an amount of light emitted from the LD is detected, and the light from the LD is decided to be incident upon a generally central portion of the core if the light amount satisfies a predetermined level. Normally, those optical components are firmly fixed by welding or with an adhesive, after the positioning process.

According to the conventional positioning method, however, it is impossible to decide how much and in which direction the incident position of the light from the LD is shifted, when the amount of the emitted light is below the predetermined level. Accordingly, the relative positioning between the incident position and the core of the optical fiber has to be repeated on a "trial and error" basis, until the amount of the light emitted by the LD reaches the predetermined level, which is troublesome and time consuming.

Further, though the relative positions of the components are fixed with an adhesive upon completing the positioning operation by the above method, to thereby constitute an optical communication module, the following issues still remain unsettled. Firstly, when the optical communication module is fabricated as above, the evaluation of the product cannot be executed until the adhesive completely dries after the adhesion, since deformation of or damage to the components due to shrinkage of the adhesive or the process may occur. It is therefore difficult to achieve a high yield with such an optical communication module. Secondly, if the performance level of the optical communication module deteriorates with time, it is no longer possible to readjust the performance, and hence the high-precision positioning performance cannot be maintained.

Desirable remedies for solving the foregoing problems include actually detecting the incident position of the light from the LD on a light receiving facet of the optical fiber, so as to adjust the position such that the incident position coincides with the center of the core, and constituting the optical communication module so as to constantly perform the positioning operation with respect to the light from the LD. In order to practically carry out such remedies, the light receiving facet of the optical fiber has to be processed so as to enable detecting the incident position on the light receiving facet with high precision, and processing the light receiving facet so that the boundary between the core and the clad can be clearly identified on the light receiving facet of the optical fiber.

An example of processing a light receiving facet of an optical fiber is disclosed in each of Japanese Patent Provisional Publications No. H05-107428 (hereafter, referred to as a document 1) and No. 2001-305382 (hereafter, referred to as a document 2).

The documents 1 and 2 both aim at improvement in propagation efficiency of light when optically connecting an optical fiber with another optical device such as an optical waveguide. These documents disclose a method of forming a core facet of the optical fiber in a protruding shape, or providing a protruding member close to the core facet. The method of processing disclosed in the documents 1 and 2 can be appropriately employed when processing an emitting facet situated opposite to another optical device, i.e. a facet serving for optical connection with another optical device.

The method of forming the core facet in a protruding shape according to the document 1 utilizes a difference in etching rate due to a difference in composition between the core and the clad, and is hence unable to precisely process the core facet so that the core can be clearly distinguished from the clad. Accordingly, employing an optical fiber processed as above does not lead to high-precision detection of an incident position of light from the LD.

In the method of forming a protruding member close to the core according to the document 2, it is difficult to achieve a correct alignment between the optical fiber and a mask used for exposing only a predetermined portion of the optical fiber. Therefore, the method disclosed in the document 2 is unable to precisely process the core facet so that the core can be clearly distinguished from the clad. Consequently, the method of processing disclosed in the documents 1 and 2 cannot be employed as a method of processing a light receiving facet intended for the high-precision position detection and positioning operation for the light receiving facet.

SUMMARY OF THE INVENTION

The present invention is advantageous in that it provides a method of processing an optical fiber that enables clear distinction of a boundary between a core and a clad on a light receiving facet, so as to be suitably implemented in an optical communication apparatus capable of performing a high-precision positioning operation with respect to light from an LD.

According to an aspect of the invention, there is provided a method of processing an optical fiber having a core and a clad. The optical fiber has a first facet and a second facet. The method includes fixing the optical fiber in a state in which at least a portion thereof is bent in a predetermined curvature radius, applying a resist to a region on the first facet at least including an entirety of the core, irradiating the second facet with light of a predetermined wavelength so that only the resist applied to the core in the first facet is exposed to the light through an inside of the optical fiber, developing the resist, and forming a level gap at a boundary between the core and the clad in the first facet utilizing the resist remaining after the irradiating and the developing.

By the method thus arranged, since the optical fiber is bent in a predetermined curvature radius, a portion of the light incident upon the clad, out of the light passing through the optical fiber from the second facet, is attenuated a plurality of times and hence can barely affect the exposure, even though such portion of the light reaches the first facet. In contrast, the light that has entered the core repeats total reflection inside the core, to be thereby introduced only to the resist applied to the core in the first facet. As a result, the method allows exposing only the resist applied to the core, with high precision.

Accordingly, the method allows clearly identifying a boundary between the core and the clad on the first facet, i.e. evidently exhibiting a difference in optical performance between the core and the clad on the first facet. Employing the optical fiber thus processed enables detecting an incident position of the light from a light source on the first facet, based on the difference in optical performance. Based on such detection result, a negative feedback control can be performed so as to set the incident position of the light from the light source on the center of the core. If the optical fiber is incorporated in an optical communication apparatus such that the first facet serves as a receiving facet for the light from the light source, the optical communication apparatus can perform the positioning operation either constantly or at a desired timing, and can thereby maintain the high performance level, free from variation in environment of use or fluctuation with time.

Optionally, the method may include finishing at least a portion of an outer surface of the clad in a rough surface.

With this configuration, the attenuation effect due to scattering at the outer wall of the clad is enhanced.

Still optionally, the method may include providing at least one coating on an outer surface of the clad.

With this configuration, the attenuation effect due to scattering at the interface between the clad and the coating can be further enhanced.

Still optionally, the method may include providing two or more coatings on an outer surface of the clad, and finishing at least one of interfaces between the coatings in a rough surface.

With this configuration, the attenuation effect due to scattering at the interface between the coatings can be enhanced.

Still optionally, the method may include providing two or more coatings on an outer surface of the clad. In this case, UV light may be used as the light of the predetermined wavelength in the irradiating, and at least one of the two or more coatings may be formed of a UV-absorbing material.

Still optionally, a coating which is one of the two or more coatings and is formed of the UV-absorbing material may have a higher refractive index for the UV light than an inner adjacent coating of the coating formed of the UV-absorbing material.

In a particular case, nylon which is opaque to the UV light may be used as the UV-absorbing material.

Optionally, a following condition may be satisfied:

$$20 \leq R \leq 200 \quad (1)$$

where R (mm) represents the predetermined curvature radius.

In a particular case, the resist may be applied to an entire region of the first facet in the applying.

In a particular case, the resist may be a negative resist.
In a particular case, the resist may be a positive resist.

Optionally, the forming of the level gap may include performing a surface treatment at least within a region close to the core on the clad in the first facet so as to generate a difference in reflectance between the region and the core, and stripping the resist remaining on the first facet subjected to the surface treatment.

In a particular case, the surface treatment may be a treatment of vapor-depositing a metal material in a form of a thin film at least within the region close to the core on the clad in the first facet.

Optionally, the forming of the level gap may include performing an etching on a region where the resist is no longer present on the first facet, and stripping the resist remaining on the first facet, after the etching.

Still optionally, the forming of the level gap may include filling a region where the resist is no longer present in the first facet with a material that has generally the same refractive index as the optical fiber, and stripping the resist remaining on the first facet after the filling.

BRIEF DECRIPTION OF THE ACCOMPANYING DRAWINGS

FIGS. 7A to 7F are schematic side views for explaining the method of processing an optical fiber according to the second embodiment;

FIG. 8 is a perspective view showing an optical fiber processed by a method of processing according to a third embodiment;

FIGS. 9A to 9F are schematic side views for explaining the method of processing an optical fiber according to the third embodiment;

FIGS. 10A to 10F are schematic side views for explaining a method of processing an optical fiber according to a fourth embodiment; and FIG. 11 is a schematic diagram showing a configuration of an optical communication module including the optical fiber processed by the method of processing according to the first embodiment.

DETAILED DESCRIPTION OF THE EMBODIMENTS

Hereafter, embodiments according to the present invention will be described. As described below, a method of processing an optical fiber is described in the embodiments. The optical fibers 3A, 3B, 3C, 3D processed by the method according to a first embodiment, and to a second to a fourth embodiments to be subsequently described, are all intended for use in an optical communication module, so as to serve to transmit a signal light from an LD (laser diode). The essence of the method of processing an optical fiber according to the embodiment lies in forming a level gap of a predetermined dimension with high precision, for clearly defining optical performance of a core and a clad on a light receiving facet of the optical fiber to be processed. Accordingly, it becomes possible to constantly perform the positioning of the laser diode with respect to the optical fiber with high precision, based on the difference in optical performance defined by the level gap in the optical communication module implemented with the optical fiber processed by the method according to the embodiment.

Figure 1:
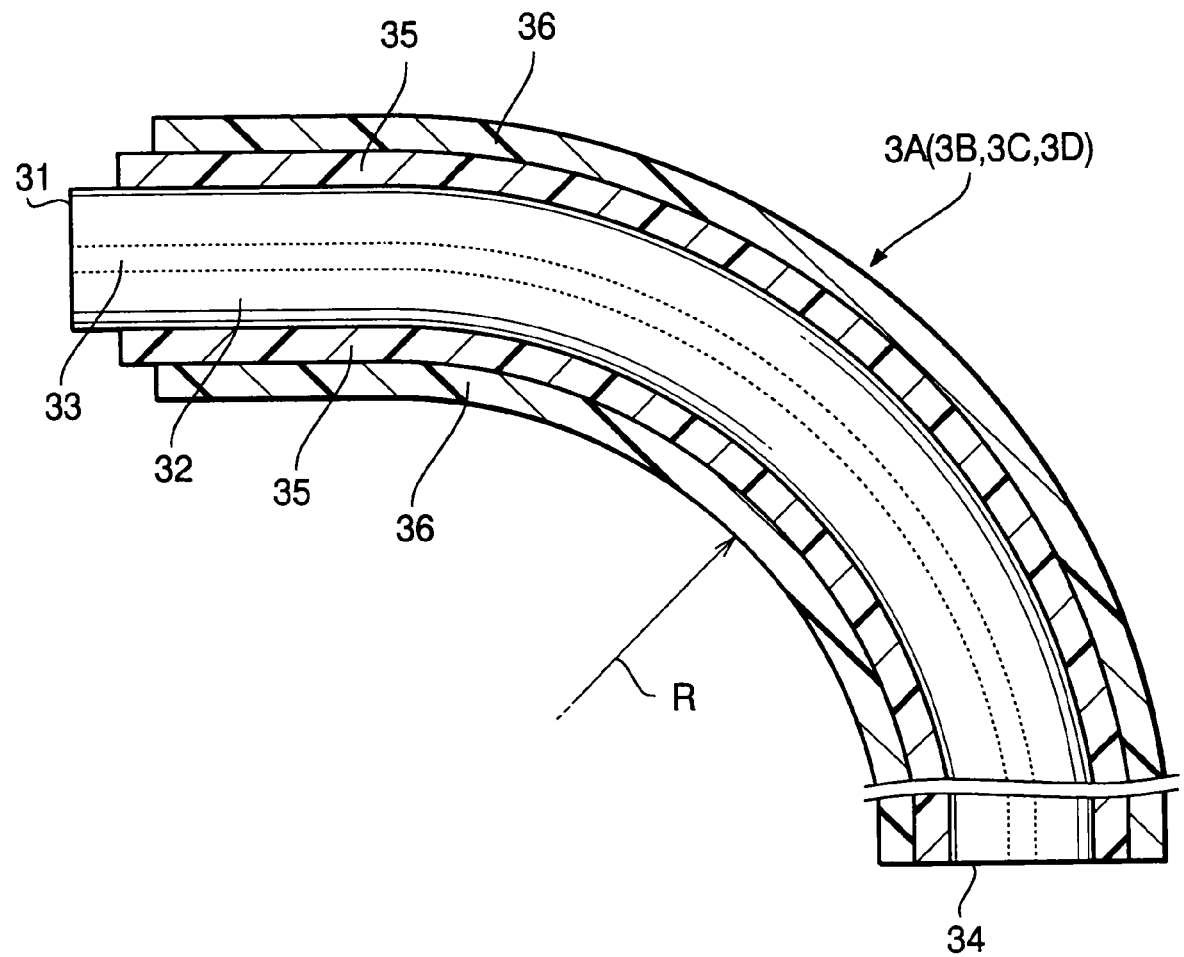
FIG. 1 is a schematic cross-sectional view showing an optical fiber before being processed by a method of processing according to embodiments of the present invention.

FIG. 1 is a schematic cross-sectional view showing an optical fiber 3A (3B, 3C, or 3D) before being processed by the method of processing according to the respective embodiments. As shown in FIG. 1, the optical fiber 3A (3B, 3C, or 3D) includes a main body constituted of a clad 32 and a core 33. The optical fiber 3A (3B, 3C, or 3D) includes a first facet 31, and a second facet 34 on the opposite end to the first facet 31. The main body is coated with a film 35 made of a UV-curing resin, for protection. The UV-curing resin film 35 is constituted of material having a higher refractive index with respect to UV light, than the clad 32. It is to be noted that the term "refractive index" herein referred to stand for a refractive index with respect to UV light, unless otherwise stated. The UV-curing resin film 35 has an outer face, i.e. a surface processed in advance in a rough surface. The surface processing methods include grinding. As already stated, since the UV-curing resin film 35 having a higher refractive index than the clad 32 is provided over the clad 32, the UV light is not totally reflected at the interface between the clad 32 and the UV-curing resin film 35.

In all the embodiments described below, the method of processing is started with coating a surface of the UV-curing resin film 35 of the optical fiber 3A (3B, 3C, or 3D) with material having a higher UV-absorbance than the UV-curing resin film 35 (a coating process). In the embodiments, nylon 36 which does not transmit the UV light is employed as the coating material, because the UV light is used in the processing. The nylon 36 has a higher refractive index than the outermost layer of the optical fiber, i.e. the UV-curing resin film 35 provided for protecting the optical fiber. Accordingly, in the optical fiber 3A to 3D, the refractive index becomes greater in a layer closer to the ambience (ambient air), i.e. in the sequence of the clad 32, the UV-curing resin film 35, and the nylon 36. Alternatively, the clad 32, the UV-curing resin film 35 and the nylon 36 may have generally the same refractive index.

Although the first facet 31, and end portions of the UV-curing resin film 35 and the nylon 36 on the side of the first facet 31 are illustrated as stepped in FIG. 1, it is only for explicitness in description. In the method of processing according to the present invention, practically the end portions of the UV-curing resin film 35 and the nylon 36 on the side of the first facet 31 are disposed to be flush with the first facet 31. This is also the case with FIGS. 3 and 4 to be subsequently described.

Upon finishing the coating with the nylon 36, the optical fiber 3A (3B, 3C, or 3D) is bent at a portion in a predetermined curvature radius R, and fixed as it is (fixing process). The curvature radius R (mm) is determined to satisfy a condition (1).

$$20 \leq R \leq 200 \qquad (1)$$

The above range protects the optical fiber from an undue load that may damage the optical fiber, and also facilitates exposing the first facet of the optical fiber with high precision. When the curvature radius exceeds the upper limit, the scattering effect for the UV light incident upon the clad is lowered, in the exposing process to be described later. In contrast when the curvature radius is below the lower limit, the optical fiber is subjected to an excessive load, by which the optical fiber may be broken or disconnected.

The lower limit may be raised, for example up to 50 mm, depending on the structure or material of the optical fiber 3A (3B, 3C, or 3D). In the embodiments, the curvature radius R is set at approx. 100 mm.

Once the coating process and the fixing process have been completed, the method of processing according to the respective embodiments differs from one another. Hereunder, the method of processing of each embodiment will be described by turns.

FIRST EMBODIMENT

Figure 2:
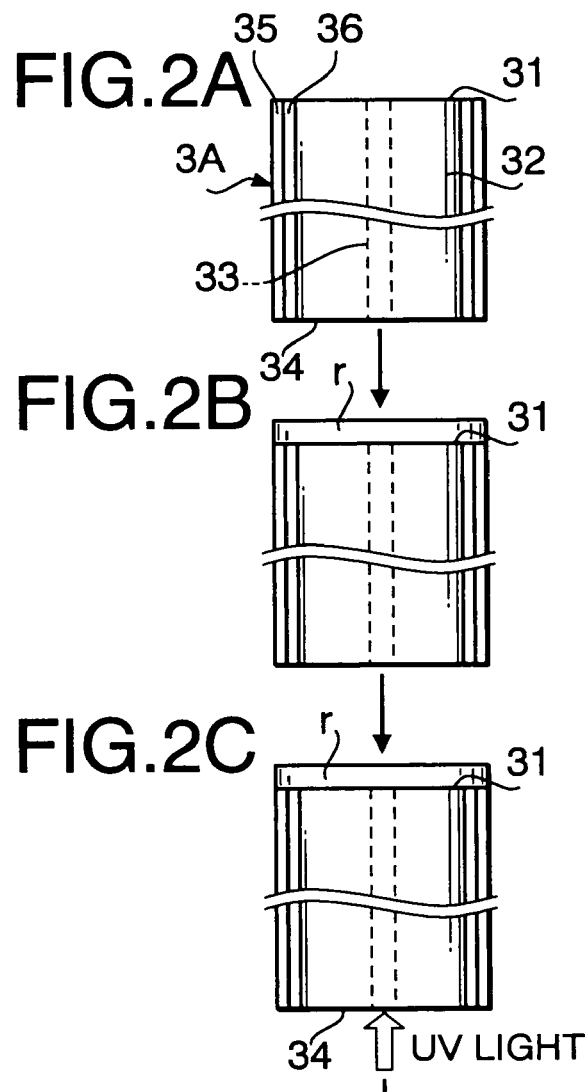
FIGS. 2A to 2F are schematic side views for explaining the method of processing an optical fiber according to a first embodiment.

FIGS. 2A to 2F are schematic side views for explaining the method of processing an optical fiber according to the first embodiment. FIG. 2A depicts the optical fiber 3A that has undergone the coating process and the fixing process. On the optical fiber 3A bent in a predetermined curvature radius R and thus fixed, a resist r is applied to an entire region of the first facet 31, in a generally uniform thickness, as shown in FIG. 2B (a resist coating process). For applying the resist in a generally uniform thickness, a technique such as a spin coating or spray coating may be employed. The resist r employed in the first embodiment is of a negative type.

After the resist r has been applied to the entire region of the first facet 31 in a uniform thickness, an exposing/developing process is carried out. In the exposing/developing process, firstly UV light is irradiated from the second facet 34 as shown in FIG. 2C. The UV light incident upon the second facet 34 passes through inside the core 33, to thereby reach the resist r. Irradiating thus the UV light from the side of the second facet 34, instead of from the side of the first facet 31 to which the resist has been applied, allows skipping a process of generating a mask for the first facet 31, thereby achieving a simple and quick processing method.

Figure 3:
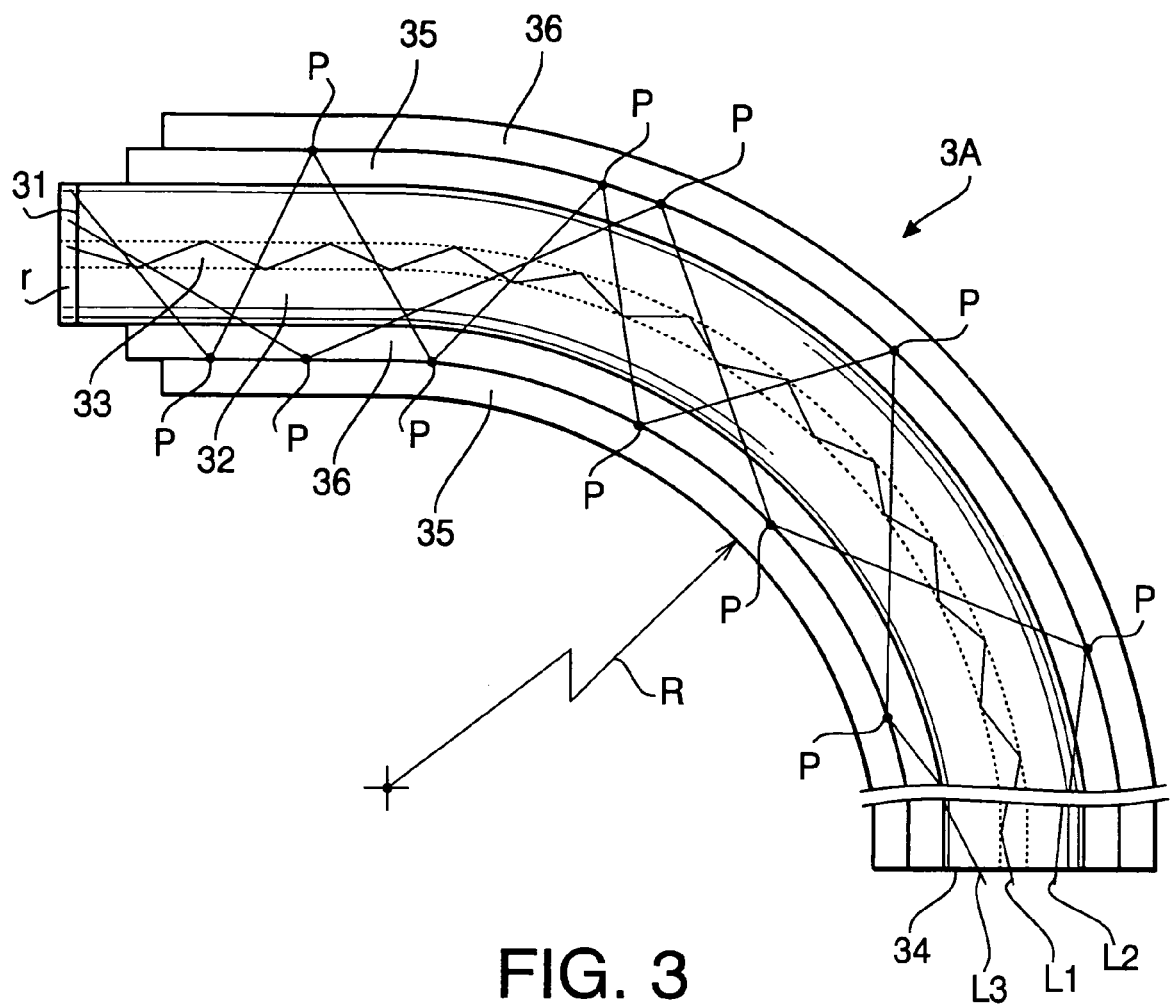
FIG. 3 is a schematic side view showing an optical fiber ready for exposure after a coating process and a fixing process.

FIG. 3 is a schematic side view showing the optical fiber 3A in the exposure process after the optical fiber 34 has undergone the coating and fixing processes. In FIG. 3, a symbol L1 designates a light beam generally perpendicularly incident upon the second facet 34 and passing through inside the core 33, L2 designates a light beam generally perpendicularly incident upon the second facet 34 and passing through inside the clad 32, and L3 designates a light beam obliquely incident upon the clad portion on the second facet 34, respectively.

As shown in FIG. 3, during the exposing process in the method of processing according to the first embodiment, the light beam L1 proceeds inside the core 33 repeating total reflections substantially without being affected by the bent shape of the optical fiber, because the core 33 is as fine as several microns in diameter. Thus the light beam L1 is incident upon the first facet 31 without being attenuated. In contrast, the light beams L2, L3 reach the first facet 31 after repeating reflections at the interface between the UV-curing resin film 35 and the nylon 36, since the optical fiber 3A is bent in the preceding fixing process. In FIG. 3, the incident positions of the light beams L2, L3 at the interface are indicated by symbols "P".

On the optical fiber 3A the nylon 36 has a higher refractive index than the UV-curing resin film 35, as already stated. Accordingly, when the light beams L2, L3 are reflected at the points P, the angle of the light beam with respect to the nylon 36 exceeds the critical angle of the total reflection, and thus a portion of the light beam leaks outward. More specifically, the light beams L2 and L3 are subjected to an optical attenuation at the points P, such as scattering, transmission or absorption into the nylon 36. This is what is called an optical radiation loss due to bending. In addition, since the UV-curing resin film 35 is processed to have a rough surface, the light can be more effectively attenuated.

In this way, unlike the light beam L1, the light beams L2 and L3 reach the first facet 31 after being attenuated through a plurality of reflections at the interface between the UV-curing resin film 35 and the nylon 36. Accordingly, the light beams L2 and L3 are far less intense than the light beam L1, upon reaching the first facet 31. Therefore, even though the light beams L2 and L3 are incident upon the resist r applied to the clad 32, it barely contributes for the exposure of the resist r. In contrast, the light beam L1 incident upon the first facet 31 through the core 33 is scarcely attenuated, and hence exposes the resist r applied to the core 33 with sufficient intensity.

The irradiation time of the UV light is determined such that the resist r applied to the core 33 can be sufficiently exposed. After the exposure, the development is performed, so that the unexposed portion of the resist r, i.e. the resist r applied to the clad 32, is dissolved and removed.

FIG. 2D depicts the state of the optical fiber 3A after the developing process. In view of FIG. 2D, it is apparent that irradiating the UV light from the side of the second facet 34 for exposure results in leaving only the portion of the resist r in the region corresponding to the core 33 generally in a column shape including the core 33 as its bottom face.

Then, a metal material m is vapor-deposited in a uniform thickness on the first facet 31 that has just undergone the developing process, thus to form a mirror surface (vapor deposition process). FIG. 2E depicts the state of the optical fiber 3A where the metal material m (indicated by oblique lines in FIG. 2E) has been vapor-deposited on the first facet 31. Examples of the metal material m include high-reflectance metals such as Cr, Cu, Au and Al. When depositing the metal material m on the first facet 31, a sputtering process or CVD (Chemical Vapor Deposition) may be performed, instead of the vapor deposition. By thus depositing the metal material m in a form of a thin film, a portion of the first facet 31 corresponding the clad 32 becomes a mirror-finished surface. After vapor-depositing the metal material m on the first facet 31, the resist r remaining on the first facet 31 is lifted off together with the metal material m vapor-deposited on the resist r, so that the core 33 is exposed (a resist stripping process). For stripping the remaining resist r, a solution of acetone or the like may be employed. FIG. 2F depicts the optical fiber 3A from which the resist r has been stripped. At this stage, the optical fiber 3A obtains the structure shown in FIG. 4.

Figure 4:
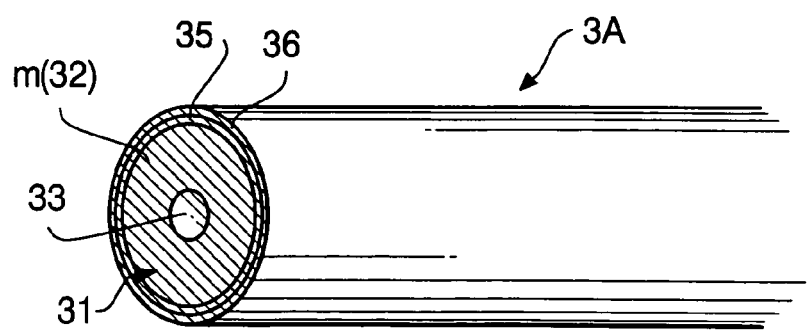
FIG. 4 is a perspective view showing the optical fiber processed by the method of processing according to the first embodiment.

Referring to FIG. 4, the first facet 31 of the optical fiber 3A has been processed such that a region except the core 33, i.e. a generally entire region of the clad 32 has a different reflectance from that of the core 33. To be more detailed, by the method of processing according to the first embodiment, since the metal material m is coated in a form of a thin film generally all over the clad 32, a level gap is provided in a form of a recessed portion on the core 33, on the first facet 31.

The optical fiber 3A shown in FIG. 4 provides a higher reflectance of the first facet 31, than a conventional optical fiber in which no treatment is applied to the clad 32 on the first facet 31. Accordingly, implementing the optical fiber 3A in an optical communication module such that the first facet 31 serves as the light receiving facet for the light from the laser diode allows detecting an amount of light incident upon the clad 32 and then reflected thereby. This leads to high-precision adjustment of the incident position to the center of the core 33, on the light receiving facet (first facet 31).

Figure 5:
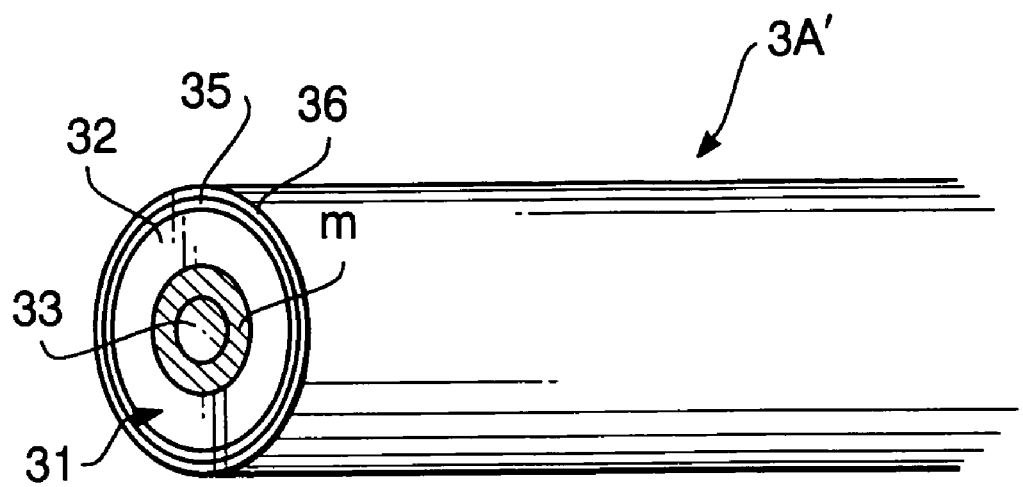
FIG. 5 is a perspective view showing another optical fiber processed by the method of processing according to the first embodiment.

The foregoing is the method of processing an optical fiber according to the first embodiment. In this method, the mirror surface is formed all over the first facet 31. However, the mirror surface may be formed only in the vicinity of the core 33, depending on specifications of an optical communication apparatus implemented with the optical fiber thus processed, more specifically on a design of a position detection system employed in the apparatus. In such a case, the thin film of the metal material m may be provided only on a portion of the clad 32 around the core 33 as shown in FIG. 5, so as to constitute an optical fiber 3A' including a ring-shaped mirror surface region surrounding the core 33.

Also, in the first embodiment, a high-reflectance metal material m such as Cr is vapor-deposited so as to form the level gap, thus creating a variation in reflectance by regions on the first facet 31. However, the material to be coated in a thin film is not limited to a metal material such as Cr. Any other material may be employed, as long as the material generates a difference in reflectance between the core 33 and clad 32 required for clearly detecting the boundary therebetween based on the light reflected by the first facet 31. For example, a material having a reflectance at least higher than that of the core can make the surface of the clad 32 smooth, and thereby achieve a similar effect as the first embodiment mentioned above. Even when employing a material other than the metal material m, the optical fiber 3A is subjected to similar processing to those shown in FIGS. 2A to 2F, and hence detailed explanation of the method of processing in that case is not be repeated herein.

SECOND EMBODIMENT

Figure 6:
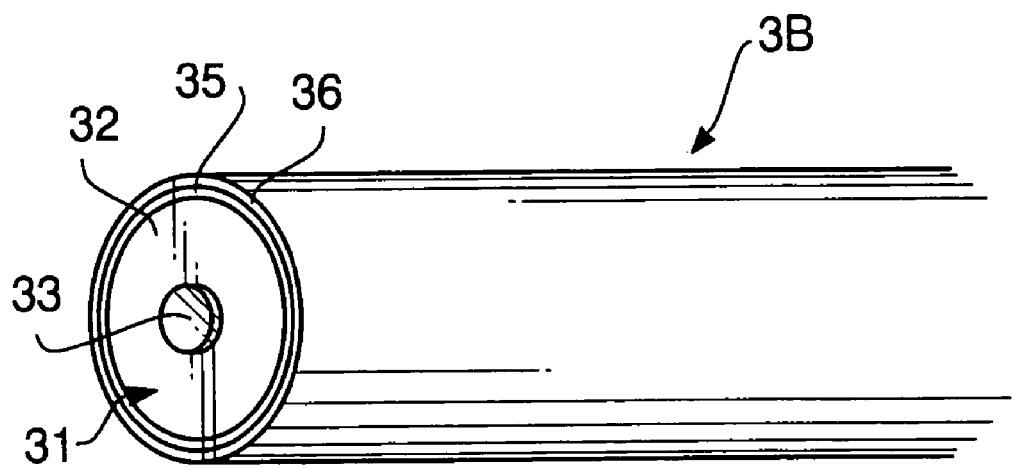
FIG. 6 is a perspective view showing an optical fiber processed by a method of processing according to a second embodiment.

FIG. 6 is a perspective view showing an optical fiber 3B processed by a method of processing according to a second embodiment. In this embodiment, to elements which are the same as those of the first embodiment, the same reference numbers are assigned, and explanations thereof will not be repeated. As shown in FIG. 6, the optical fiber 3B is constituted such that on the first facet 31 the core 33 protrudes by a predetermined amount along an optical axis of the optical fiber 3B, and a top portion of the protruding core 33 is generally parallel to the facet of the clad 32. The predetermined amount is set to be smaller than $\lambda/4$, so as to cause diffraction when light is incident on both of the clad 32 and the protruding core 33. Here, $\lambda$ stands for a wavelength of the incident light. In this embodiment, the predetermined amount is set at $\lambda/8$, so as to attain a largest difference in light intensity between the light incident upon the core 33 and reflected thereby, and the light incident upon the clad 32 and reflected thereby.

Implementing the optical fiber 3B, provided with the level gap thus formed, in an optical communication module such that the first facet 31 serves as the light receiving facet for light from the laser diode allows the optical communication module to detect the light intensity distribution of the reflected light from the core 33 and the reflected light from the clad 32. Further, based on the detected light intensity distribution, the optical communication module can precisely adjust the incident position of the light from the laser diode to the center of the core 33, on the light receiving facet (first facet 31).

It should be noted that such position detection based on the light intensity distribution on the light receiving facet cannot be performed by an optical communication module provided with a conventional optical fiber. Also, the optical fiber according to the foregoing documents 1 and 2, having a lens integrally formed therein, has a convex lens-shaped core on a processed facet (an emitting facet). That is, a portion close to the core is formed to be a convex lens shape. Accordingly, even though such an optical fiber is implemented in the optical communication module such that the processed facet serves as the light receiving facet, the foregoing diffraction cannot be effectively obtained, and therefore the high-precision position detection and the positioning operation based on the light intensity distribution cannot be performed.

To be more specific, the method of manufacturing according to the document 1 includes utilizing a difference in dissolving rate between the clad and the core, by which the core, which is not supposed to be dissolved, is also dissolved. Therefore the optical fiber thereby fabricated can only provide insufficient optical transmission efficiency, and is hence unsuitable for typical optical communication. The method of manufacturing according to the document 2 includes complicated steps, which not only incurs an increase in manufacturing cost, but also fails to achieve a satisfactory yield. Such drawbacks incidental to the conventional technique can be eliminated by the method of processing according to the second embodiment, through the following steps.

FIGS. 7A to 7F are schematic side views for explaining the method of processing an optical fiber according to the second embodiment. The resist r employed in the second embodiment is also of the negative type, as in the first embodiment. The method of processing according to the second embodiment is similar to the method of processing in the first embodiment up to the exposing/developing process via the coating process and fixing process. Accordingly, the optical fiber 3B shown in FIG. 7A is the same as FIG. 1, and the states thereof shown in FIGS. 7A to 7D are the same as those shown in FIGS. 2A to 2D, respectively.

Referring to FIG. 7D, the optical fiber 3B that has undergone the exposing/developing process and carrying the residual resist only in a region corresponding to the core 33 is subjected to an etching applied to the clad 32 where the resist r is no longer present (an etching process). The etching process is generally classified into a wet etching and a dry etching, and either may be employed in the method of processing according to the present invention. In this embodiment the dry etching is adopted, in order to form the level gap between the core 33 and the clad 32 with high precision, since the accuracy in this aspect is essential for detecting the light intensity distribution necessary for high-precision position detection of light. For the dry etching process according to this embodiment, a FAB (fast atomic beam) processor may be suitably employed, because of its excellent anisotropic etching performance. FIG. 7E depicts the optical fiber 3B that has undergone the etching process such that the height of the level gap between the core 33 and the clad 32 becomes $\lambda/8$. FIG. 7F depicts the optical fiber 3B from which the resist r has been stripped. At this stage, the optical fiber 3B obtains the structure shown in FIG. 6.

The foregoing is the method of processing an optical fiber according to the second embodiment. Although the negative resist is employed in the second embodiment, employing a positive resist allows achieving an optical fiber 3C which provides the same advantage as the optical fiber 3B.

THIRD EMBODIMENT

FIG. 8 is a perspective view showing an optical fiber 3C processed by a method of processing according to a third embodiment. In this embodiment, to elements which are the same as those of the first and second embodiments, the same reference numbers are assigned, and explanations thereof will not be repeated. As shown in FIG. 8, in the optical fiber 3C, the core 33 is recessed by a predetermined amount on the first facet 31 along an optical axis of the optical fiber 3C, and a bottom portion of the recessed core 33 and the facet of the clad 32 are generally parallel. The predetermined amount is preferably set at a value smaller than $\lambda/4$. In this embodiment, the predetermined amount is set at $\lambda/8$ for the optical fiber 3C.

FIGS. 9A to 9F are schematic side views for explaining the method of processing the optical fiber 3C according to the third embodiment. The method of processing according to the third embodiment is similar to the method of processing in the second embodiment up to the exposing/developing process via the coating process and fixing process, except that a positive resist r is employed in the resist coating process. Accordingly, the optical fiber 3C shown in FIG. 9A is the same as FIG. 1, and the states thereof shown in FIGS. 9A to 9C are the same as those of the optical fiber 3B shown in FIGS. 7A to 7C, respectively.

FIG. 9D depicts the optical fiber 3C that has just undergone the exposing/developing process. As already stated, a positive resist r is employed in the third embodiment. Accordingly in the optical fiber 3C shown in FIG. 9D, unlike the case of the optical fibers 3A and 3B, only the resist r applied to the exposed region corresponding to the core 33 has been removed.

FIG. 9E depicts the optical fiber 3C subjected to an etching process after the state of FIG. 9D. In the third embodiment also, the dry etching is performed as in the second embodiment. In the optical fiber 3C shown in FIG. 9E, the core 33 has been etched until a level gap between the facet of the core 33 and the clad 32 becomes $\lambda/8$. FIG. 9F depicts the optical fiber 3C from which the resist r has been stripped after the etching process, thus to expose the clad 32. At this stage, the optical fiber 3C obtains the structure shown in FIG. 8.

FOURTH EMBODIMENT

In the method of processing according to the second and the third embodiments, the level gap between the core 33 and the clad 32 on the first facet 31 is formed through the etching process. However, the level gap can be formed by a different technique from the etching process. FIGS. 10A to 10F are schematic side views for explaining a method of processing an optical fiber 3D according to a fourth embodiment. The method of processing according to the fourth embodiment is generally similar to the method of processing in the third embodiment up to the exposing/developing process. Accordingly, the optical fiber 3D shown in FIG. 10A is the same as FIG. 1, and the states thereof shown in FIGS. 10A to 10C are the same as those of the optical fiber 3C shown in FIGS. 9A to 9C, respectively.

In the method of processing according to the fourth embodiment, a predetermined material g is filled in a region corresponding to the core 33 of the optical fiber under the state shown in FIG. 10D, so as to form the level gap (FIG. 10E). As the material g, for example a glass ($SiO_2$) having generally the same refractive index as that of the core 33 may be suitably employed, so as not to impede the optical transmission. The predetermined material g is filled so as to accord with the height of the level gap, i.e. to achieve a thickness corresponding to $\lambda/8$. Then as shown in FIG. 10F, the resist r is stripped (lifted off), so that the optical fiber 3D of generally the same structure as the optical fiber 3B shown in FIG. 6 can be obtained.

Since the positive resist r is employed in the fourth embodiment, the material g is filled in the region corresponding to the core 33, so as to form the level gap. Such method of the fourth embodiment can be modified by employing the negative resist instead. To achieve such modifications, a material identical to the clad 32, or a material having generally the same refractive index as the clad 32 is coated on a region where the resist has been removed, i.e. the region corresponding to the clad 32, so as to achieve the height of $\lambda/8$.

As described above, according to the embodiment, since the optical fiber is bent in a predetermined curvature radius, a portion of the light incident upon the clad, out of the light passing through the optical fiber from the second facet, is attenuated a plurality of times and hence can barely affect the exposure, even though such portion of the light reaches the first facet 31. In contrast, the light that has entered the core repeats total reflection inside the core, to be thereby introduced only to the resist applied to the core in the first facet 31. As a result, the method (process) according to the embodiment allows exposing only the resist applied to the core 33, with high precision.

Implementing the optical fibers 3A to 3D processed as above in the optical communication module described here below allows the optical communication module to constantly perform the positioning operation of adjusting the incident position of the light form the laser diode to the center of the core 33 on the first facet 31.

Hereunder, the positioning operation performed by an optical communication module 10 with respect to signal light for transmission incident upon the light receiving facet 31 of the optical fiber 3A will be described. FIG. 11 is a schematic diagram showing a configuration of an optical communication module including the optical fiber 3A. The optical communication module 10 serves as an ONU that introduces the optical fiber communication into a subscriber's house. The optical communication module 10 supports interactive WDM communication utilizing an optical fiber for transmitting an upstream signal having a wavelength of for example 1.3 μm, and for receiving a downstream signal having a wavelength of for example 1.5 μm.

The optical communication module 10 shown in FIG. 11 includes a laser diode LD, a first condenser lens 2, the optical fiber 3A, a second condenser lens 4, a photo detector 5, a controller 6 and an actuator 7.

The laser diode LD working as a light source of the transmission signal light is a surface emitting laser, which is capable of modulating the transmission signal light according to the information to be transmitted. The laser diode LD, the first condenser lens 2 and the optical fiber 3A are disposed such that the respective optical axes coincide with respect to each other. The optical fiber 3A is installed such that the first facet 31 confronts the first condenser lens 2. In other words, the first facet 31 serves as a plane to which the light from the laser diode LD is introduced. The transmission light having a wavelength of 1.3 μm emitted by the laser diode LD is converged by the first condenser lens 2 toward the light receiving facet (first facet) 31 of the optical fiber 3. The transmission light is transmitted to an optical communication module (not shown) on a receiving side, via the optical fiber 3A. This is how the optical communication is performed.

When performing a positioning operation with the optical communication module 10, the light reflected by the light receiving facet 31 is led to the second condenser lens 4. Here, processing the optical fiber facet 31 so as to be inclined with respect to the optical axis eliminates the need to provide a means of directing the reflected light to the second condenser lens 4, thereby achieving a reduction in the number of components. The second condenser lens 4 collects the reflected light and directs the reflected light to the photo detector 5. The photo detector 5 is located so as to be optically conjugate with the light receiving facet 31. In other words, the light reflected at the center of the optical fiber is incident generally upon the center of a receiving surface of the photo detector 5.

The photo detector 5 is a quadrant photo-diode having four areas equally divided by two boundary lines orthogonal to each other, intersecting at the center of the receiving surface of the photo detector 5. The photo detector 5 transmits light amount data representing the light amount in each area, to the controller 6.

As described above, the reflectance of the core 33 is far lower than the clad 32 (mirror surface). Accordingly, since the light reflected by the core 33 is extremely faint, the photo detector 5 may fail to detect the reflected light. The photo detector 5 according to this embodiment is, therefore, provided with a higher sensitivity in the area where the light reflected by the core 33 is to be introduced, so as to precisely detect the amount of the light reflected by the core 33, on the receiving surface of the photo detector 5.

The controller 6 performs, upon receipt of the light amount data of the respective areas of the photo detector 5, a negative feedback control so that the light from the laser diode LD is incident upon the center of the core 33. More specifically, the controller 6 drives the first condenser lens 2 via the actuator 7 so as to move the incident position of the light from the light source on the light receiving facet 31, until the amounts of light incident upon the respective areas become equivalent to each other. When the amounts of light incident upon the areas are equivalent to each other, the light from the laser diode LD is incident upon the center of the core 33.

The foregoing positioning operation is performed not only at an initial setting in the manufacturing process of the optical communication module 10, but is constantly carried out after turning on the optical communication module 10 and during the execution of the optical communication. In other words, the photo detector 5 constantly receives the light from the LD while the optical communication is being executed. Therefore, the controller 6 can perform the negative feedback control such that the amounts of the light incident upon the areas become equivalent to each other, based on the light amount data constantly or periodically transmitted from the photo detector 5.

That is how the optical communication module 10 implemented with the optical fiber 3A performs the positioning operation. The optical communication module 10 can equally perform the foregoing operation when one of the optical fibers 3B to 3D is implemented in place of the optical fiber 3A. When any of the optical fibers 3B to 3D is employed, however, the controller does not perform the negative feedback control such that the amounts of the light incident upon the areas on the receiving surface become equivalent to each other. Instead, the controller 6 performs the negative feedback control such that the light intensity distribution of the light reflected by the light receiving facet 31 accords with a predetermined distribution obtained when the light from the LD is incident upon the center of the core 33.

According to the foregoing embodiments, the coating process, the fixing process and the resist coating process are performed in this sequence. However, in the method of processing according to the present invention, the coating, fixing and resist coating processes do not necessarily have to be performed in this sequence. For example, the coating process and the resist coating process may be first performed, before performing the fixing process.

Also, in the foregoing embodiments, the optical fiber is bent at one position in the fixing process, as shown in FIG. 1. As long as the curvature radius is set within the desirable range, the optical fiber may be bent at a plurality of positions in the fixing process. Bending the optical fiber a plurality of times naturally increases the times (i.e. the number of points P) that the light incident upon the clad on the second facet 34 (such as the light beams L2 and L3) hits the interface between the UV-curing resin film 35 and the nylon 36, thus causing the attenuation more frequently than in the embodiments. As a result, the exposure process that achieves even more precise distinction of the core and the clad on the first facet 31 can be performed.

Also, while the UV-curing resin film 35 is provided outside the clad in the foregoing embodiment, for increasing the strength of the optical fiber, UV-curing resin film 35 is not necessarily required if the optical fiber has a sufficient strength. In this case, the nylon 36 is coated over the clad. Therefore, finishing the outer surface of the clad in a rough surface enhances the light attenuation effect.

Further, according to the present invention, simply bending the optical fiber, without providing the nylon coating, can provide the attenuation effect with respect to the light beams L2 and L3 (see FIG. 3). Therefore, one of the methods according to the above mentioned embodiments may be adopted while taking into consideration the balance between the time and cost required for the processing of the optical fiber and the expected precision level for the identification of the boundary between the core and the clad.

Further, in the foregoing embodiments the resist r is applied to a generally entire region of the first facet 31. However, when a negative resist is employed, the level gap can be duly formed provided that the resist is applied to a region at least including the entirety of the core 33 on the first facet.

What is claimed is:

1. A method of processing an optical fiber having a core and a clad, the optical fiber having a first facet and a second facet, the method comprising:
   fixing the optical fiber in a state in which at least a portion thereof is bent in a predetermined curvature radius;
   applying a resist to a region on the first facet at least including an entirety of the core;
   irradiating the second facet with light of a predetermined wavelength so that only the resist applied to the core in the first facet is exposed to the light through an inside of the optical fiber;
   developing the resist; and
   forming a level gap at a boundary between the core and the clad in the first facet utilizing the resist remaining after the irradiating and the developing.

2. The method according to claim 1, further comprising finishing at least a portion of an outer surface of the clad in a rough surface.

3. The method according to claim 1, further comprising providing at least one coating on an outer surface of the clad.

4. The method according to claim 1, further comprising:
   providing two or more coatings on an outer surface of the clad; and
   finishing at least one of interfaces between the coatings in a rough surface.

5. The method according to claim 1, further comprising providing two or more coatings on an outer surface of the clad,
   wherein UV light is used as the light of the predetermined wavelength in the irradiating, and
   wherein at least one of the two or more coatings is formed of a UV-absorbing material.

6. The method according to claim 5, wherein a coating which is one of the two or more coatings and is formed of the UV-absorbing material has a higher refractive index for the UV light than an inner adjacent coating of the coating formed of the UV-absorbing material.

7. The method according to claim 5, wherein nylon which is opaque to the UV light is used as the UV-absorbing material.

8. The method according to claim 1, wherein a following condition is satisfied:

$$20 \leq R \leq 200 \tag{1}$$

where R (mm) represents the predetermined curvature radius.

9. The method according to claim 1, wherein the resist is applied to an entire region of the first facet in the applying.

10. The method according to claim 1, wherein the resist is a negative resist.

11. The method according to claim 1, wherein the resist is a positive resist.

12. The method according to claim 10, wherein the forming of the level gap includes:
   performing a surface treatment at least within a region close to the core on the clad in the first facet so as to generate a difference in reflectance between the region and the core; and
   stripping the resist remaining on the first facet subjected to the surface treatment.

13. The method according to claim 12, wherein the surface treatment is a treatment of vapor-depositing a metal material in a form of a thin film at least within the region close to the core on the clad in the first facet.

14. The method according to claim 1, wherein the forming of the level gap includes:
   performing an etching on a region where the resist is no longer present on the first facet; and
   stripping the resist remaining on the first facet, after the etching.

15. The method according to claim 11, wherein the forming of the level gap includes:
   filling a region where the resist is no longer present in the first facet with a material that has generally the same refractive index as the optical fiber; and
   stripping the resist remaining on the first facet after the filling.

* * * * *